United States Patent
Weifels

(10) Patent No.: US 9,073,522 B2
(45) Date of Patent: *Jul. 7, 2015

(54) CONTROL ELEMENT FOR A PARKING LOCK

(71) Applicant: ZF FRIEDRICHSHAFEN AG, Friedrichshafen (DE)

(72) Inventor: Carsten Weifels, Barver (DE)

(73) Assignee: ZF Friedrichshafen AG, Friedrichshafen (DE)

(*) Notice: Subject to any disclaimer, the term of this patent is extended or adjusted under 35 U.S.C. 154(b) by 0 days.

This patent is subject to a terminal disclaimer.

(21) Appl. No.: 14/172,319

(22) Filed: Feb. 4, 2014

(65) Prior Publication Data

US 2014/0151180 A1 Jun. 5, 2014

Related U.S. Application Data

(63) Continuation of application No. 13/125,926, filed as application No. PCT/DE2009/050060 on Oct. 23, 2009, now Pat. No. 8,678,160.

(30) Foreign Application Priority Data

Oct. 29, 2008 (DE) .......................... 10 2008 043 249

(51) Int. Cl.
    *F16H 63/34* (2006.01)
    *B60T 1/00* (2006.01)

(52) U.S. Cl.
    CPC ............ *B60T 1/005* (2013.01); *F16H 63/3458* (2013.01); *F16H 63/3433* (2013.01); *F16H 63/3475* (2013.01); *F16H 63/3491* (2013.01)

(58) Field of Classification Search
    CPC ............ F16H 63/3491; F16H 63/3458; F16H 63/3475; F16H 63/3433

USPC .......................................... 192/219.4–219.6
See application file for complete search history.

(56) References Cited

U.S. PATENT DOCUMENTS 3,110,363 A 11/1963 Chapman, Jr. et al.
4,518,066 A * 5/1985 Barr .......................... 192/219.5

(Continued)

FOREIGN PATENT DOCUMENTS

DE 19820920 A1 11/1999
DE 10105637 A1 8/2002

(Continued)

OTHER PUBLICATIONS

International Search Report for PCT/DE09/50060 dated Feb. 4, 2010.

*Primary Examiner* — Rodney H Bonck
*Assistant Examiner* — Lillian Nguyen
(74) *Attorney, Agent, or Firm* — Cohen & Hildebrand, PLLC

(57) ABSTRACT

A parking lock control element has an actuator coupled to a parking lock pawl, and a retaining device which works with the actuator to secure the parking lock pawl in the disengaged position. The connecting device is characterized in that the retaining device has a blocking slide connected to the actuator, and a blocking actuator having a slider gap, the width of the slider gap being modified in an actuating manner, wherein the blocking slide can move into the slider gap—when the slider gap is open—releasing the actuator. The connecting device reduces structural complexity and related costs. At the same time, the control element is comparatively robust with respect to manufacturing tolerances, acceleration forces, vibrations, and temperature stress. With minimal auxiliary energy, high holding forces can be achieved to secure the parking lock pawl. An emergency unlocking actuation can also be integrated in a simple manner.

12 Claims, 2 Drawing Sheets

(56) References Cited

U.S. PATENT DOCUMENTS

| | | | |
|---|---|---|---|
| 5,671,638 | A | 9/1997 | Hattori et al. |
| 6,481,556 | B1 | 11/2002 | Haupt |
| 6,619,459 | B2 | 9/2003 | Gudlin |
| 8,678,160 | B2 * | 3/2014 | Weifels .................... 192/219.5 |
| 2002/0088684 | A1 | 7/2002 | Hoess et al. |
| 2008/0277236 | A1 | 11/2008 | Ruhringer et al. |
| 2009/0321215 | A1 | 12/2009 | Giefer et al. |
| 2010/0288598 | A1 * | 11/2010 | Giefer et al. ............ 192/219.6 |
| 2011/0005890 | A1 | 1/2011 | Volz et al. |

FOREIGN PATENT DOCUMENTS

| | | |
|---|---|---|
| DE | 102005002448 | 7/2006 |
| DE | 102005049177 A1 | 4/2007 |
| DE | 102006039862 | 3/2008 |
| DE | 102008000857 | 10/2009 |
| JP | 2006322489 | 11/2006 |

* cited by examiner

CONTROL ELEMENT FOR A PARKING LOCK

CROSS-REFERENCE TO RELATED APPLICATIONS

This application is a continuation application of U.S. patent application Ser. No. 13/125,926, filed on Apr. 25, 2011, which was a national stage application filed under 35 U.S.C. §371 of PCT/DE2009/050060, claiming priority to DE 10 2008 043 249.0, filed on Oct. 29, 2008, each of which is herein incorporated by reference in their entirety.

BACKGROUND OF THE INVENTION (1) Field of the Invention

The invention relates to a parking lock control element for an automobile transmission, in particular for an automatic transmission, wherein the parking lock control element includes an actuator configured for translational movement and mechanically coupled to the parking lock pawl, and a retaining device operating on the actuator for securing the parking lock pawl in the disengaged position.

(2) Description of Related Art

Parking locks are always employed when non-mechanical components are used for transmitting drive forces in an automobile, in particular in automatic transmissions having a hydrodynamic torque converter. Automobiles with automatic transmissions are typically equipped with a parking lock to prevent the vehicle from accidentally rolling when the vehicle is stationary and the engine is shut off.

To this end, the parking lock blocks—for example, following an operation initiated by the driver—the driven transmission shaft which is non-rotatably connected to the drive wheels, typically through engagement of a locking pawl arranged in the automatic transmission with teeth of a parking lock wheel arranged on the driven transmission shaft.

Various mechanical, electro-hydraulic as well as electromechanical systems are largely known in the art as a transmission device between such parking lock implemented, for example, as a locking pawl and the operating device for the vehicle transmission arranged in the passenger compartment of the automobile. Mechanical transmission devices for operating the parking lock include, for example, a Bowden cable disposed between the selection lever arranged in the passenger compartment and the transmission control arranged on the automatic transmission.

To improve the structural design with respect to the unrestricted arrangement of the actuator in the passenger compartment and to ensure acoustic decoupling between the actuator and the drive train of the automobile, modern automobiles or automatic transmissions have increasingly transitioned to the shift-by-wire principle, since modern automatic transmissions are more and more fully electronically controlled.

The shift commands in these "shift-by-wire" transmissions are typically transmitted from the operating device and/or from the selection lever of the automatic transmission exclusively by way of electrical or electronic signals. In other words, with respect to the parking lock, the parking lock is typically also operated electrically or electro-hydraulically. However, in certain situations, the parking lock can also be operated automatically, for example when Auto-P is engaged, i.e., when the parking lock engages automatically after the ignition key is pulled out or when exiting the automobile.

The parking lock of shift-by-wire-operated transmissions is frequently engaged mechanically in by way of a spring energy store, whereas the parking lock is typically disengaged hydraulically by way of the oil pressure circulation of the automatic transmission. To prevent the parking lock from being unintentionally engaged, for example in the event of a faulty transmission oil supply, as long as the operating stage "P" is not being engaged on the selection lever, an additional locking device must be provided for the parking lock, which prevents engagement of the parking lock by using the force from the spring energy store in the transmission at least until the selection lever has been brought into the operating stage P or Auto-P.

More particularly, these locking devices for parking locks demand the smallest possible actuating force or actuating energy accompanied by high locking forces, as well as additionally a high degree of safety against faulty actuation, for example caused by vibrations, dirt or temperature changes.

Several control elements of the generic type for parking locks with locking devices are known in the art. Reference is made particularly to the documents DE 10 2008 000 857, DE 10 2005 002 448 A1 and DE 10 2006 039 862, each of which discloses control elements for parking locks with locking devices. The operating devices and locking devices disclosed therein each have a toggle lever, which is brought into an almost outstretched position for locking the parking lock in the disengaged position. Due to the kinematics of the toggle lever, relatively high locking forces can be combined with comparatively small release forces.

One characteristic property of these conventional locking devices is that particularly the toggle lever devices must be manufactured with precise tight tolerances, in order to safely implement the desired large quotient between locking force and release force. The employed toggle lever locks may also respond to different ambient conditions and must thus be protected, in particular, from contamination and strong vibrations.

SUMMARY OF THE INVENTION

With this backdrop, it is therefore an object of the present invention to provide a parking lock operating device with a retaining device for securing the parking lock pawl in the disengaged position, so as to overcome the aforementioned limitations of the state-of-the-art. In particular, the invention should reduce the complexity associated with the operating device and/or the retaining device, and reduce the ensuing costs. In addition, the retaining device should be robust and relatively insensitive against manufacturing tolerances, high acceleration forces and vibrations as well as the different temperature situations and ambient conditions.

One aspect of the present invention is directed to a parking lock control element for controlling a parking lock pawl of an automobile transmission, the control element. The parting lock control element includes an actuator mechanically coupled to the parking lock pawl and a retaining device operating on the actuator for securing the parking lock pawl in the disengaged position. The retaining device includes a blocking slide connected to the actuator, and a blocking actuator with a slider gap having a width adjustable in an actuated manner via the blocking actuator between a first gap width, in which the blocking slide is retractable into the slider gap by releasing the parking lock pawl, and a second gap width narrower than that of the first gap width, in which the locking slide is prevented from retracting into the slider gap by blocking the actuator (6).

In a basically conventional manner, the parking lock control element according to the present invention includes an actuator configured for substantially translational movement. The actuator is also used, in an essentially conventional manner, for mechanically engaging the pawl of a parking lock and is hereby mechanically coupled with the parking lock pawl—or with its operating mechanism inside the transmission—, i.e., the actuator follows the movement of the parking lock pawl and/or the movement of the operating mechanism of the parking lock inside the transmission. The control element also includes a retaining device for securing the parking lock pawl in the disengaged position. The retaining device thus prevents accidental locking of the parking lock—for example due to a pressure drop in the hydraulic system of the transmission—in particular as long as the position P is not engaged on the selection lever.

According to the invention, the control element is characterized in that the retaining device includes a blocking slide connected with the actuator and a blocking actuator. The blocking actuator controls a slider gap having a variable width, wherein the blocking slide—depending on the gap width adjusted with the blocking actuator—can move into the slider gap or be prevented from moving into the slider gap, respectively.

The slider gap can hence be adjusted back and forth with the blocking actuator between a first wide gap width and a second narrow gap width. The blocking slide can move into the slider gap with the first wide gap width, thereby enabling the unlocking movement of the actuator connected with the blocking slide and hence releasing the parking lock pawl for engagement with the parking lock wheel. However, the blocking slide cannot move into the slider gap with the second narrow gap width, so that the actuator connected with the blocking slide is also blocked. In this case, the parking lock pawl cannot engage in the parking lock wheel.

The embodiment of the retaining device according to the invention for securing the parking lock pawl with slider gap and a blocking slide solves the object of the invention in that only a very small actuating force or actuating energy is required for operating the width-adjustable slider gap. At the same time, large holding forces can be generated, because the holding force and the actuating force are almost perpendicular to one another and are therefore essentially unable to influence each other. In other words, the forces required with a narrow or closed slider gap, which would be required to force the blocking slide into the slider gap (thereby releasing the parking lock for engagement) are much greater than the operating forces required to keep the slider gap closed.

The parking lock control element according to the invention thus allows secure and reliable locking of the parking lock pawl in the disengaged state, while still having a simple and robust manufacturable structure. Both the blocking slide and the width-adjustable slider gap can be produced with a minimal number of components and with a low weight. As a result, in addition to cost and weight reduction, a particularly good tolerance with respect to shock loads and vibrations is attained, and additionally a comparatively small tolerance chain which also helps increasing the reliability of the control element. Moreover, additional savings in production costs, assembly and service can be achieved.

The invention is initially realized regardless of the structural design and arrangement of the blocking slide and the slider gap, respectively, as long as the locking effect is provided by the width-adjustable slider gap. According to a preferred embodiment of the invention, the slider gap is formed by, on one hand, the gap between a stationary base and, on the other hand, a movable anchor driven by a blocking actuator, which results in a simple structure of the control element according to the invention.

The actuating forces can be transferred between the movable anchor and the stationary base in basically any manner, in particular with a servo motor, pneumatically or hydraulically. According to a particularly preferred embodiment of the invention, the blocking actuator is formed by an electromagnet, wherein the movable anchor is at the same time made from a ferromagnetic material.

Preferably, the stationary base is formed by the body of the electromagnet itself, whereas the movable anchor is preferably formed by a pivotable anchor plate. In this way, a structure with a width-adjustable slider gap can be realized with a minimal number of components, namely with only a single movable component.

Advantageously, this embodiment also has a compact and space-saving structure, while the electromagnet can be positioned substantially arbitrarily. By combining the blocking slide and the slider gap according to the invention, a small and lightweight electromagnet is realized which uses a small electric current and hence also has advantageously a space-saving design and a small energy consumption of the control element.

According to another preferred embodiment of the invention, either the blocking slide or the movable anchor, or both, are beveled at an end face toward the slider gap. This bevel particularly reduces the risk that the blocking slide gets wedged when entering the slider gap. In addition, the reliability of the parking lock pawl retaining device can be increased, because the blocking slide will be able to move into the slider gap even if the slider gap—for example, due to non-optimal lubrication or due to vibrations—does not reach its fully open state.

With this backdrop, in another embodiment according to the invention, the blocking slide is spring-loaded towards the slider gap. This measure further increases the reliability of the retaining device, because the pivotable anchor plate assumes a defined position due to the spring loading even if the actuator magnet is without current. The blocking slide can reliably move into the slider gap due to the bevel of the blocking slide and/or the anchor plate—in spite of the spring loading of the anchor plate —, as soon as current to the actuator magnet is switched off.

The invention can be implemented regardless of the manner in which the control element or the translational actuator for actuating the parking lock pawl is structurally designed and arranged. For example, the actuator can also be a purely translational operating slider, which by way of its translational movement either releases the parking lock pawl for engagement with the parking lock wheel, or locks the parking lock pawl in the disengaged position. According to a preferred embodiment of the invention, the actuator includes a pivoting lever which may be arranged, in particular, directly on a transmission selector shaft which operates the parking lock pawl.

The blocking slide according to the invention is then connected to the pivoting lever forming the actuator (whose pivotable end performs a substantially translational movement in response to a small angular movement). Depending on the gap width of the slider gap, the blocking slide is either blocked or freely movable, as are the pivoting lever connected with the blocking slide and the transmission selector shaft. In this way, a linkage for engaging and disengaging the parking lock pawl arranged inside the transmission is operated by the transmission selector shaft in a conventional manner.

The control element according to the invention can here be selectively arranged either inside the transmission housing or outside the transmission housing. Due to this flexibility in the arrangement of the control element and the blocking slide, respectively, the control element according to the invention represents a structurally simple and flexible replacement for the conventional more complex solutions.

Alternatively, according to another embodiment of the invention, the control element may not be arranged directly inside or on the transmission, but may be connected to the transmission via a cable pull or a coupling linkage. This provides even greater freedom in the design and arrangement of the control element and the retaining device.

Frequently, a control element for the parking lock of a shift-by-wire-controlled transmission also requires that the parking lock can still be disengaged—by way of emergency unlocking—when electronic systems or the electrical power supply of the automobile fail, so as to be able to move the vehicle under these circumstances. This may occur, for example, when the vehicle is in a service facility or when the vehicle is towed in the event of a defect. Shift-by-wire control elements for automatic transmissions are known, wherein an additional mechanical linkage, for example a cable pull, is provided for emergencies between the selection lever—or between an independent emergency unlocking actuation and the transmission. The parking lock can then be mechanically opened (and if necessary also be closed again) via the cable pull even if the electrical and/or hydraulic systems fail—after corresponding actuation of the emergency unlocking—, so that the vehicle can always be moved.

With this backdrop, according to another preferred embodiment of the invention, the control element has a device engaging with the actuator for mechanical emergency unlocking of the parking lock, which is preferably connected by way of a cable pull with the emergency actuating element within the reach of the driver. The operation of the emergency unlocking device directly on the actuator is advantageous because both the parking lock can be disengaged and the blocking slide can be moved out of engagement with the slider gap at the same time (for example via the transmission selector shaft).

Preferably, the emergency unlocking actuation with a cable pull is combined with a corresponding emergency unlocking actuating element within reach of the driver. Actuation with the cable pull is advantageous, because the emergency unlocking actuating element can then be more flexibly placed. In addition, undesirable transmission of structure-borne noise from the transmission into the passenger compartment can be reduced with a cable pull transmission—in particular compared to a linkage or a comparatively rigid push wire actuation.

According to another advantageous embodiment of the invention, the emergency unlocking actuation engages with the actuator with a limit stop that is open in a direction opposite the actuating direction. This approach prevents the emergency unlocking actuation and/or the cable pull from moving in conjunction with normal operating movements of the transmission control element, or with corresponding operating movements of the actuator. This can reduce wear, produce less noise, and reduce maintenance requirements as well as the force and energy requirements for the control element.

According to another preferred embodiment of the invention, the actuator operating the parking lock pawl is connected to a hydraulic actuator element, wherein the hydraulic actuator element is preferably spring-biased towards the retracted position of the parking lock pawl by a spring energy store. The hydraulic actuator element is configured to disengage the parking lock pawl from the parking lock wheel when transmission oil hydraulic pressure is applied. These embodiments are advantageous—in conjunction with the blocking slide according to the invention—because the parking lock pawl is easily and actively able to disengage with the help of auxiliary energy when hydraulic oil pressure is applied. On the other hand, due to the spring bias of the hydraulic actuating element, the parking lock can engage for safety reasons even without hydraulic oil pressure.

Even if the hydraulic system fails, the parking lock pawl can still be engaged by the spring energy store; an unintentional automatic engagement of the parking lock is here prevented by the blocking slide according to the invention, until the blocking actuator unblocks the slider gap.

BRIEF DESCRIPTION OF THE DRAWINGS

The invention will now be described in more detail with reference to drawings which illustrate only exemplary embodiments. It is shown in.

DETAILED DESCRIPTION OF THE INVENTION

Figure 1:
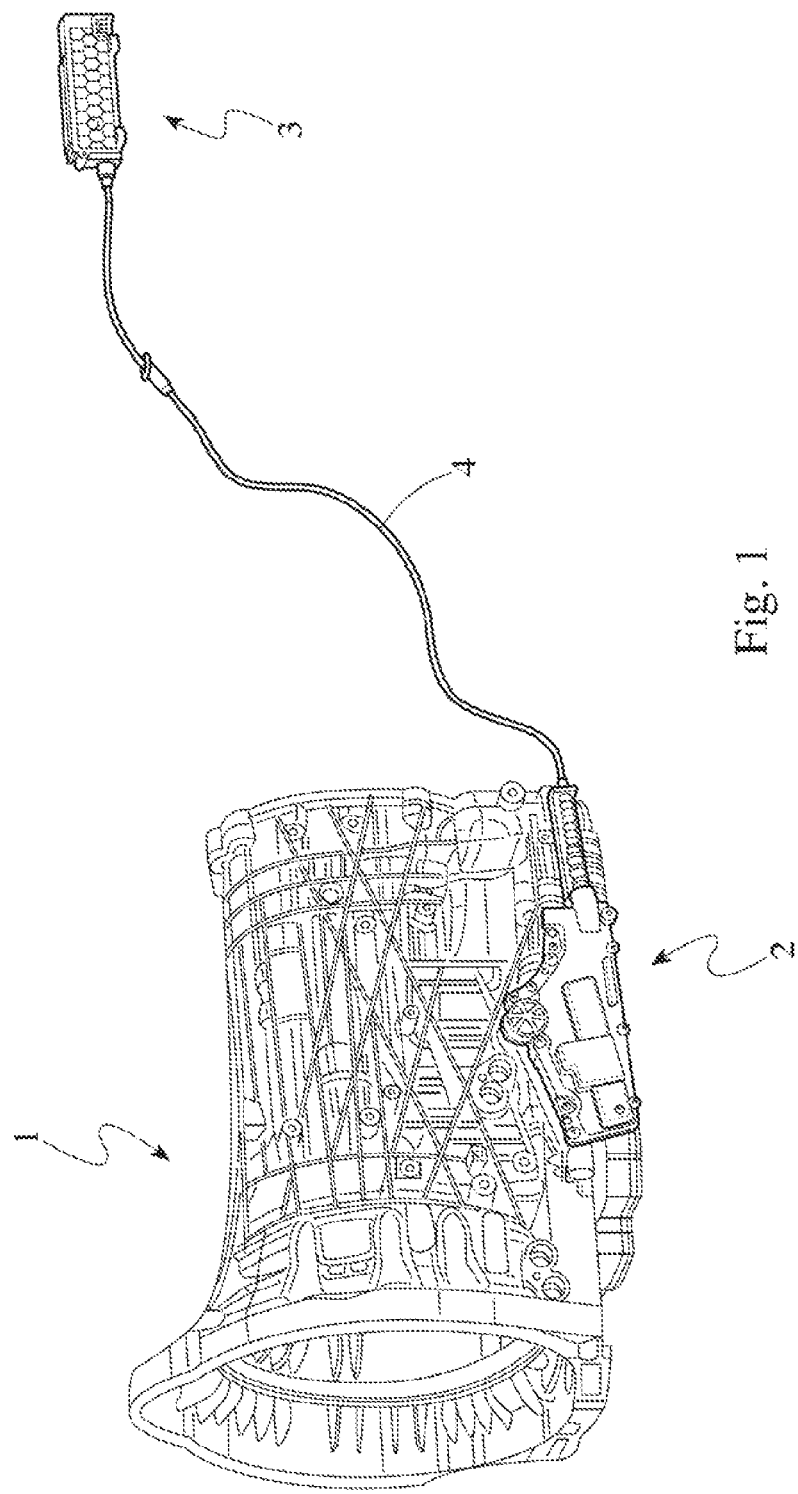
FIG. 1 in an isometric diagram, a possible arrangement of an embodiment of the control element on an automatic transmission.

FIG. 1 shows first (as indicated by a dotted line) an automatic transmission 1 for an automobile. An embodiment of a control element 2 according to the invention, which additionally has a device for mechanical emergency unlocking, is arranged on the automatic transmission 1. The emergency unlocking actuation 3 is connected to the control element 2 by a cable pull 4.

More particularly, FIG. 1 shows the compact configuration of the control element 2 as a self-contained assembly made possible by the invention, which can therefore be readily flanged directly to a transmission 1, while taking up little space. This applies in particular also to already existing embodiments of automatic transmissions, which can therefore be adapted to the control element 2 according to the invention while making only minimal changes.

FIG. 1 also shows the flexibly configurable Bowden cable 4 for the emergency unlocking actuation 3, which thus allows a particularly variable placement of the emergency unlocking actuation 3, with the Bowden cable 4 also minimizing transfer of structure-borne noise from the transmission 2 to the emergency unlocking actuation 3 and hence into the passenger compartment.

Figure 2:
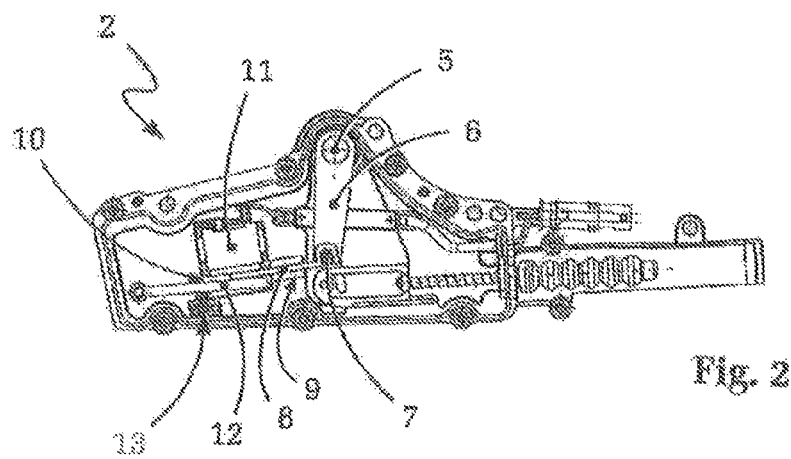
FIG. 2 the control element according to FIG. 1 in a top view, with the housing cover removed and the parking lock engaged.
Figure 3:
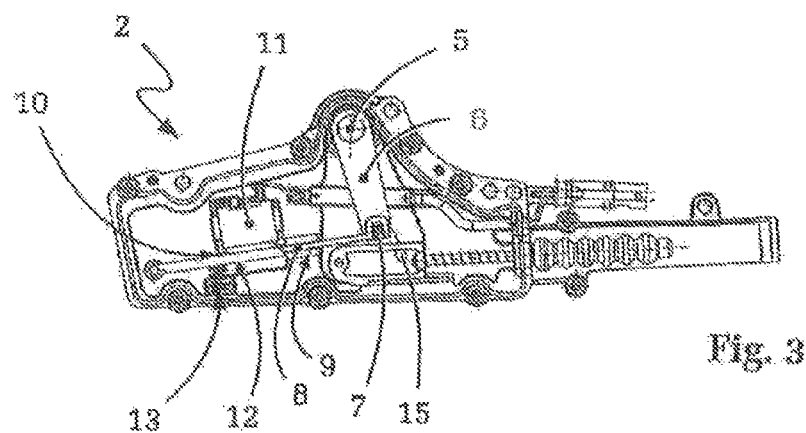
FIG. 3 in a diagram and a view corresponding to FIG. 2, the control element according to FIGS. 1 and 2, with disengaged and locked parking lock.
Figure 4:
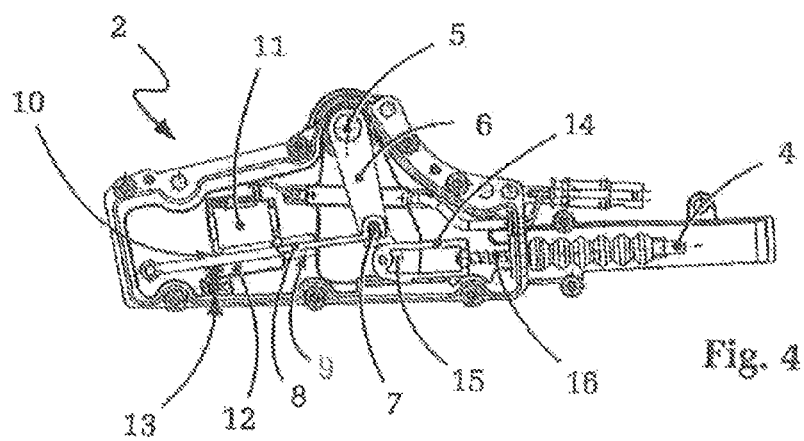
FIG. 4 in a diagram and a view corresponding to FIGS. 2 and 3, the control element according to FIGS. 1 to 3, with manually disengaged parking lock.

FIGS. 2 to 4 show the control element 2 according to FIG. 1 in different shift positions. To illustrate the functionality of the operating device 2, the housing cover of the control element 2 according to FIG. 1 has been removed in the diagrams of FIGS. 2 to 4.

In the state according to FIG. 2, the parking lock is engaged (during normal operation of the automatic transmission); in FIG. 3 the parking lock is disengaged and locked in the disengaged state; and in FIG. 4 the emergency unlocking actuation 3 was activated and the parking lock was manually disengaged.

FIGS. 2 to 4 show primarily a pivoting lever 6 connected with the transmission selector shaft 5 and forming, in this embodiment, the actuator which is connected mechanically—via the transmission selector shaft 5—to the parking lock pawl or the transmission-internal mechanism for operating the parking lock pawl (not shown). The parking lock can thus be operated manually, in particular disengaged, with the pivoting lever 6 while, on the other hand, the pivoting lever 6 abides by the normal (transmission-actuated) operations of the parking lock both during engagement as well as during disengagement of the parking lock.

The blocking slide 8 according to the invention engages directly on the pivoting lever 6 via a bolt 7. The blocking slide 8 is supported in the housing of the control element 2 by a sliding guide 9 and can be moved back and forth between a first position (see FIG. 2) and a second position (see FIGS. 3 and 4) in a horizontal direction (with reference to the drawing plane).

The blocking slide 8 engages in its first position according to FIG. 2 with a slider gap 10 having a width that can be adjusted with the actuator. The slider gap 10 is formed through cooperation between an electromagnet 11 and a pivotable anchor plate 12. If the electromagnet 11 is without current, then the blocking slide 8 can move into the gap between the electromagnet 11 and the anchor plate 12, which is further facilitated by the bevels on the opposing ends of both the blocking slide 8 and the anchor plate 12, as shown in the Figures. To define a position for the pivotable anchor plate 12 and to prevent objectionable rattling noises, the anchor plate 12 is pretensioned against the electromagnet with a relatively weak compression spring 13.

The diagram of FIG. 2 therefore corresponds (during normal operation of the automatic transmission) to the engaged parking lock. The parking lock was engaged such that the (unillustrated) transmission-internal actuator mechanism for operating the parking lock pawl, which is most frequently energized by the hydraulic oil circulation of the transmission, is deactivated and electric current to the electromagnet 11 is simultaneously switched off. The pivoting lever 6 and hence the parking lock pawl were thereby released and the parking lock pawl was able to engage in the parking lock wheel under spring bias.

Conversely, the diagram of FIG. 3 corresponds (during normal operation of the automatic transmission) to the disengaged parking lock. The parking lock is here again disengaged by the transmission-internal hydraulic actuator mechanism; however, the electromagnet 11 was simultaneously switched on. During disengagement of the parking lock, the pivoting lever 6 was then moved from the position according to FIG. 2 counterclockwise into the position according to FIG. 3, whereby the blocking slide 8, which is coupled with the pivoting lever 6, was also pulled out of the slider gap 10, thereby assuming its second position shown in FIG. 3. The slider gap 10 was closed by the spring effect of the compression spring 13 and by the attracting force of the electromagnet 11. The blocking slide 8 is then unable to enter the slider gap for as long as current continues to flow through the electromagnet 11.

This provides safety against unintended automatic engagement of the parking lock, in particular if the hydraulic oil pressure in the transmission should drop, which would otherwise cause the (spring-biased) parking lock pawl to be released and uncontrollably engage with the parking lock wheel. However, because the slider gap 10 is kept in the closed position by the electromagnet 11 and because the blocking slide 8 is connected with the pivoting lever 6 and hence also with the transmission selector shaft 5, the parking lock is prevented from engaging, even if the hydraulic systems of the transmission fail, until the transmission control switches the current through the electromagnet 11 off.

FIG. 3 finally shows how the parking lock can still be mechanically disengaged by using the control element according to the invention—which includes in the embodiment according to FIGS. 1 to 4 an emergency unlocking actuation 3, 4, see FIG. 1—even if all hydraulic and/or electrical systems of the automobile fail, so that the automobile can under these circumstances still be towed or pushed.

To this end, the emergency unlocking actuation 3 arranged in the passenger compartment is operated (see FIG. 1), whereby an actuating slide 14 arranged inside the housing of the control element 4 and connected with the Bowden cable 4 is moved to the right (in reference to the drawing plane). The actuating slide 14 engages with a nose 15 of the pivoting lever 6 which is connected to the transmission selector shaft 5, pivoting the lever 6 counterclockwise. The blocking slide 8 is thereby pulled out of the slider gap 10 and the parking lock pawl is at the same time mechanically disengaged from the parking lock wheel—via the transmission selector shaft 5. The nose 15 thus forms a limit stop for the actuating slide 14 which is open in a direction opposite to the actuation direction, so that the actuating slide 14 does not also move when (during normal operation of the automatic transmission and/or of the control element) the pivoting lever 6 moves back and forth during transmission-actuated engagement and disengagement of the parking lock.

The parking lock remains disengaged for as long as the emergency unlocking actuation 3 is in the operating position according to FIG. 4. If the emergency unlocking actuation 3 is deactivated again and tension is removed from the Bowden cable 4, then the actuating slide 14 moves again into its initial position at the left limit stop (with reference to the drawing plane), caused by a compression spring 16 arranged on the end of the Bowden cable. The pivoting lever 6 and the transmission selector shaft 5 are then also released again, and the parking lock pawl can again engage with the parking lock wheel due to its spring bias.

Because the electromagnet 11 is without current, the blocking slide 8 can at the same time move into the slider gap 10, with the blocking slide 8—due to the bevels of the opposing ends of the blocking slide 8 and the anchor plate 12—pivoting the anchor plate 12 clockwise, i.e., downward with reference to the drawing plane. The state according to FIG. 2 is then attained again.

In summary, it therefore becomes clear that a control element for a parking lock is provided by the invention, with the potential of reducing in particular the structural complexity and the associated costs. The control element according to the invention is also robust and—compared to conventional devices—insensitive to manufacturing tolerances, acceleration forces, vibrations and temperature stress. The control element reliably attains large holding forces for securing the parking lock pawl, while requiring only a small amount of additional energy.

The invention thus makes a significant contribution to improving the operational safety, cost-effectiveness, service life and ease of assembly, while simultaneously reducing the installation space for parking locks on automatic transmissions.

The invention claimed is:

1. A parking lock control element (2) for controlling a parking lock pawl of an automobile transmission, the control element (2) comprising:
   an actuator (6) mechanically coupled to the parking lock pawl, and
   a retaining device (8, 10, 11, 12) operating on the actuator (6) for securing the parking lock pawl in the disengaged position, the retaining device (8, 10, 11, 12) comprises:

a blocking slide (8) connected to the actuator (6), and a blocking actuator (11) with a slider gap (10) having a width adjustable in an actuated manner via, the blocking actuator (11) between a first gap width, in which the blocking slide (8) is retractable into the slider gap (10) by releasing the parking lock pawl, and a second gap width narrower than that of the first gap width, in which the blocking slide (8) is prevented from retracting into the slider gap (10) by blocking the actuator (6).

2. The control element according, to claim 1, wherein the slider gap (10) is formed between a stationary base of the blocking actuator (11) and a movable anchor (12) driven by the blocking actuator.

3. The control element according to claim 2, wherein the blocking actuator (11) is an electromagnet (11), and wherein the anchor (12) is made from ferromagnetic material.

4. The control element according, to claim 3, wherein the stationary base is formed b a body of the electromagnet (11).

5. The control element according to claim 1, wherein the actuator (6) of the parking lock pawl is connected to a cable pull or a coupling linkage.

6. The control element according to claim 1, wherein the control element comprises an emergency unlocking actuation (3) which operates on the actuator (6).

7. The control element according to claim 6, wherein the emergency unlocking actuation (3) is located within reach of a driver and connected to a cable pull (4).

8. The control element according to claim 7, further comprising: an actuating slide (14) connected to the emergency unlocking actuation (3) via the cable pull (4), wherein the actuating slide (14) engages with the actuator (6) by way of an end stop (15) which forms a limit stop for the actuating slide (14) that is open in a direction opposite to an actuating direction.

9. The control element according to claim 1, wherein the transmission is an automatic transmission.

10. The control element according lo claim 1, wherein the blocking actuator (11) is disposed on only one side of the blocking slide (8).

11. A parking lock control element (2) for controlling a parking lock pawl of an automobile transmission, the control element (2) comprising:

an actuator (6) mechanically coupled to the parking lock pawl, and a retaining device (8, 10, 11, 12) operating on the actuator (6) for securing the parking lock pawl in the disengaged position, the retaining device (8,10, 11, 12) comprises:

a blocking slide (8) connected to the actuator (6), and a blocking actuator (11) with a slider gap (10) having a width adjustable in an actuated manner via, the blocking actuator (11) between a first gap width, in which the blocking slide (8) is retractable into the slider gap (10) by releasing the parking lock pawl, and a second gap width narrower than that of the first gap width, in which the narrower width of the second gap prevents the blocking slide (8) from retracting into the slider gap (10) by blocking the actuator (6), wherein the parking lock pawl is disengaged through application of oil pressure circulation of the automobile transmission.

12. The control element according to claim 11, wherein the parking lock pawl is engaged by a spring energy store.

\* \* \* \* \*

UNITED STATES PATENT AND TRADEMARK OFFICE
CERTIFICATE OF CORRECTION

PATENT NO. : 9,073,522 B2  
APPLICATION NO. : 14/172319  
DATED : July 7, 2015  
INVENTOR(S) : Carsten Weifels Page 1 of 1

It is certified that error appears in the above-identified patent and that said Letters Patent is hereby corrected as shown below:

Claims

Col. 9, line 11, delete the ",".

Col. 9, line 19, change "b" to --by--.

Col. 10, line 19, delete the ",".

Signed and Sealed this
Tenth Day of November, 2015

Michelle K. Lee
*Director of the United States Patent and Trademark Office*